United States Patent Office 3,458,515
Patented July 29, 1969

3,458,515
PIPERAZINE SUBSTITUTED PYRROLES
John L. Archibald, Windsor, Berks, England, and Meier E. Freed, Philadelphia, Pa., assignors to American Home Products Corporation, New York, N.Y., a corporation of Delaware
No Drawing. Filed July 21, 1966, Ser. No. 566,739
Int. Cl. C07d 57/00, 51/00, 27/22
U.S. Cl. 260—268    5 Claims

ABSTRACT OF THE DISCLOSURE

Substituted pyrroles having selected aliphatic and heterocyclic substituents in the 2, 3, 4, and 5 positions of the ring are prepared. The compounds and their acid-addition salts are useful in the field of pharmacology, particularly showing central nervous system sedative action.

---

This invention relates to substituted pyrroles together with a method for preparing them, and more particularly, to certain substituted pyrroles having useful pharmacological or therapeutic actions either as free bases or in the form of acid-addition salts.

The compounds of the invention fall within and may be illustrated by the following structural formula:

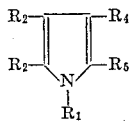

In the formula shown, $R_1$ represents either hydrogen or an alkyl, aryl, aralkyl, aminoalkyl, dialkylaminoalkyl or cyanoalkyl radical, $R_3$ and $R_5$ representing hydrogen, alkyl, aryl, acyl, carbalkoxy, carboxy or carboxyalkyl, these two radicals being either similar to each other or different. $R_2$ and $R_4$ represent dissimilar radicals and stand for hydrogen, a lower acyl, preferably acetyl, a lower acyloxy, preferably propionoxy, or a radical which may be designated as X—Y—Z in which X and Y each represent a CO, $CH_2$ or a CH(OH) radical, while Z represents $NH_2$ when both X and Y are both CO, a halogen atom or a substituted amino radical NR'R" in which R' and R" are dissimilar and stand for either hydrogen, a lower alkyl having at least three carbon atoms, preferably 3 to 5 carbon atoms, aryl, aminoalkyl or dialkylaminoalkyl, or where NR'R" are joined to represent a 5, 6 or 7-membered, nitrogen-containing heterocyclic ring. The latter may optionally have a second hetero atom or group such as O or NR''', in which R''' may be hydrogen, alkyl, aralkyl, or another pyrroleglyoxyloyl moiety or reduction product thereof.

Novel intermediates are also contemplated among the compounds of the invention, particularly where X and Y both represent CO and Z stands for chlorine.

The final compounds have been found to have central nervous system activity, particularly sedative action.

The pharmacological activity may be demonstrated when a compound is administered at a daily dosage level ranging from 10 to 600 mg. per kilogram given as a single dose or in divided doses, either orally or parenterally. The active drug may be combined with inert extenders or carriers which may be solid or liquid, in the latter case, aqueous or oleaginous.

To prepare the compounds, the general procedure involves reacting a selected pyrrole with oxalyl halide in a suitable solvent such as ether or chloroform and preferably, in the presence of an acid acceptor, for example, a base such as potassium bicarbonate. The reaction may be carried out at a temperature from —50° to 50° C. Where the pyrrole has an electron-withdrawing group (such as a carbalkoxy od acyl group) or is an N-substituted pyrrole, the reaction may be conveniently carried out at a temperature from 0° to 50° C. If the pyrrole does not have an electron-withdrawing group, the reaction is carried out at the lower end of the temperature range, from 0° to —60° C., preferably from —30° to —60° C.

After the formation of the acid halide, the latter is then reacted with an amine or amino compound. The reaction being exothermic, cooling may be necessary to hold the temperature in the range of 0° C. to about room temperature.

Where compounds are desired in which X and/or Y are $CH_2$ or CH(OH) rather than CO, the pyrroleglyoxylamide previously formed is reduced with lithium aluminum hydride using a suitable solvent, for example, tetrahydrofuran.

In carrying out the procedures described, where it is desired that the radical X—Y—Z be in the 4-position, one must start with pyrroles having substituents other than hydrogen in the 2- and 5-positions. This is necessary in order to block the oxalyl halide from attaching at one of these positions.

It is often preferable to utilize the compounds in the form of non-toxic or pharmaceutically acceptable acid-addition salts. These may be prepared in the usual way by reacting the pyrrole with a mineral or organic acid. Suitable acids for this purpose are well-known as, for example, hydrogen halide, phosphoric or sulfuric acids, acetic, fumaric, maleic, tartaric, etc.

For a more detailed and specific description of the invention, the following examples are given for illustrative purposes. The temperatures given are to be understood as being in degrees centigrade.

EXAMPLE 1

Pyrrole 2-glyoxylamide

A solution of pyrrole (3.4 g.) in dry ether (250 ml.) was stirred and cooled in an ice bath while oxalyl chloride (9.4 g.) was added slowly dropwise. The resulting dark green solution was added with stirring to about 250 ml. of concentrated aqueous ammonia and the ether layer was separated and dried. Evaporation of the ether and crystallization of the residue from water provided colorless needles (1.1 g.) M.P. 125–6°. Recrystallization from water and then from ethanol gave the product, M.P. 126–7°.

*Analysis.*—Calcd. for $C_6H_6N_2O_2$: C, 52.17; H, 4.38; N, 20.28. Found: C, 52.42; H, 4.46; N, 20.07.

EXAMPLE 2

1-(pyrrole-2-glyoxyloyl)pyrrolidine

Pyrrole (26.8 g.) in ether (500 ml.) was stirred and cooled in a Dry Ice acetone bath, keeping the temperature between —50° and —60°. Oxalyl chloride (40 ml.) was added dropwise and cooling and stirring were continued for 1 hour. The reaction mixture was siphoned into a stirred ice-cooled mixture of pyrrolidine (70 g.) in ether (250 ml.) and potassium bicarbonate (100 g.) in water (500 ml.). The resulting precipitate was collected giving 12.75 g. of product, M.P. 111–112°. The aqueous layer of the filtrate was extracted with chloroform (×3) and the extracts were combined with the ether layer, dried and evaporated in vacuo. Recrystallization of the residue from water provided a further 12.7 g. of product. M.P. 112–113°.

*Analysis.*—Calcd. for $C_{10}H_{12}N_2O_2$: C, 62.48; H, 6.29; N, 14.58. Found: C, 62.70; H, 6.57; N, 14.60.

If it is desired to have a substituent other than hydrogen on the pyrrolo nitrogen, one reacts the product, for example, as obtained hereinabove, with sodium hydride and then with a halogenated alkylating agent. Thus the product after treatment with sodium hydride may be reacted with diethylaminopropyl chloride to make 1-(3-diethylaminopropyl)-2-(pyrrolidinoglyoxyloyl)pyrrole.

EXAMPLE 3

N-[2-(dimethylamino)ethyl]pyrrole-2-glyoxylamide

A solution of pyrrole-2-glyoxyloyl chloride was prepared from pyrrole and oxalylchloride in ether at −50° C. as in Example 2. Excess N,N-dimethylethylene diamine was added to the reaction mixture and it was allowed to warm to room temperature. The ether solution was decanted from a pink gum and filtered. Evaporation of the filtrate gave a yellow solid from which the product was obtained by two recrystallizations from water as colorless needles M.P. 116–117°.

*Analysis.*—Calcd. for $C_{10}H_{15}N_3O_2$: C, 57.40; H, 7.23; N, 20.08. Found: C, 57.13; H, 7.06; N, 19.80.

EXAMPLE 4

1,4-bis(pyrrole-2-glyoxyloyl)piperazine

Pyrrole (26.8 g.) in ether (400 ml.) was stirred and cooled to below −50° while oxalyl chloride (40 ml.) was added dropwise during 20 min. The reaction mixture was poured into a vigorously stirred mixture of potassium bicarbonate (100 g.) in water (600 ml.) and piperazine (43 g.) in chloroform (400 ml.) and the resultant precipitate (73 g.) was collected. Recrystallization from aqueous dimethylformamide provided the product as colorless crystasl M.P. 235–7° (d) (49 g.). Recrystallization of a portion gave an analytical sample M.P. 237–8° (d).

*Analysis.*—Calcd. for $C_{16}H_{16}N_4O_4$: C, 58.53; H, 4.91; N, 17.01. Found: C, 58.60; H, 5.16; N, 17.31.

EXAMPLE 5

1-(4-acetyl-3,5-dimethylpyrrole-2-glyoxyloyl)-4-phenylpiperazine

Oxalyl chloride (2.9 ml.) was added dropwise to a stirred solution of 2,4-dimethyl-3-acetylpyrrole (4.1 g.) in dry ether (500 ml.). Stirring was continued 1 hr., then the deep red precipitate was filtered off. This material (2.2 g.) M.P. 286–8° (d) was shown to be 1,2-di(4-acetyl-3,5-dimethyl-2-pyrryl)ethane-1,2-dione, hemihydrate.

*Analysis.*—Calcd. for $C_{18}H_{20}N_2O_4 \cdot \frac{1}{2}H_2O$: C, 64.12; H, 5.99; N, 8.30. Found: C, 64.14; H, 5.98; N, 8.27.

The filtrate was poured onto 12 g. of N-phenylpiperazine and the resulting precipitate was collected, washed well with water and dried. Recrystallization from aqueous acetone gave the product (3.75 g.) M.P. 212–13°.

*Analysis.*—Calcd. for $C_{20}H_{23}N_3O_3$: C, 67.97; H, 6.56; N, 11.89. Found: C, 68.14; H, 6.34; N, 12.11.

EXAMPLE 6

3,5-dimethyl-4(4-methyl-1-piperazinylglyoxyloyl)-pyrrole 2-carboxylic acid, ethyl ester Oxalyl chloride (0.75 ml.) was added dropwise to a stirred solution of 2,4-dimethyl-5-carbethoxypyrrole (1.3 g.) in ether (50 ml.) and the mixture was left overnight at room temperature. Potassium bicarbonate (2.5 g.) in water (10 ml.) was added and the mixture was stirred while N-methylpiperazine (1.0 g.) in methylene chloride was added dropwise. The organic layer was dried ($MgSO_4$) and evaporated and the residue was recrystallized from aqueous ethanol. The first crop was unchanged 2,4-dimethyl-3-carbethoxypyrrole, M.P. 118–121°.

Concentration of the mother-liquor provided the product as colorless needles M.P. 167–8°.

*Analysis.*—Calcd. for $C_{16}H_{23}N_3O_4$: C, 59.79; H, 7.21; N, 13.08. Found: C, 60.07; H, 7.07; N, 13.21.

In the same way as taught in this example, one may prepare 1-phenethyl-2,5-dimethyl-3-(piperidinoglyoxyloyl) pyrrole by reacting oxalyl chloride with 1-phenethyl-2,5-dimethylpyrrole and then with piperidine.

EXAMPLE 7

α-(2-pyrrolyl)-1-pyrrolidineethanol 2.6 g. of 1-(pyrrole-2-glyoxyloyl)pyrrolidine was added in portions to a stirred suspension of 1.3 g. of lithium hydride in 100 ml. of tetrahydrofuran. The mixture was refluxed for 2 hours then kept at room temperature overnight. Water (10 ml.) was added dropwise with stirring then the inorganic material was filtered off. Evaporation of the filtrate gave a colorless solid which was recrystallized from ethanol to give the product as colorless prisms (1¼ g.) M.P. 118–119°.

*Analysis.*—Calcd. for $C_{10}H_{16}ON_2$: C, 66.63; H, 8.95; N, 15.54. Found: C, 66.86; H, 8.74; N, 15.34.

EXAMPLE 8

1-(2-cyanoethyl)pyrrole-2-glyoxylamide 1-(2-cyanoethyl)pyrrole (24 g.) in dry ether (100 ml.) was added dropwise under reflux to a stirred solution of oxalyl chloride (20 ml.) in ether (300 ml.). The crystalline product was collected, washed well with ether and dried to provide 1-(2-cyanoethyl)pyrrole-2-glyoxyloyl chloride, (38.75 g., 93 percent) M.P. 99–101°.

The foregoing product was added portionwise to a stirred concentrated aqueous ammonia solution and the resulting precipitate was collected. Recrystallization from water provided the product as colorless needles, M.P. 133–4°.

EXAMPLE 9

N-isopropylpyrrole-2-glyoxylamide

Pyrrole (26.8 g.) in ether (100 ml.) was added dropwise during 20 minutes to a stirred solution of oxalyl chloride (40 ml.) in ether (400 ml.) at −50°. Stirring at −50° was continued for 40 minutes, then the reaction mixture was poured slowly into a cooled solution of isopropylamine (118 g.) in ether (500 ml.). The precipitate ws filtered off and washed well with methylene chloride (ca. 1 l.). Evaporation of the combined filtrates gave a solid which was recrystallized from ethanol to provide the product as colorless needles (47.0 g.), M.P. 120–123°.

*Analysis.*—Calcd. for $C_9H_{12}N_2O_2$: C, 59.98; H. 6.71; N, 15.55. Found: C, 59.81; H, 6.87; N, 15.66.

EXAMPLE 10

1,4-bis[2-hydroxy-2(2-pyrrolyl)ethyl] piperazine 10.0 g. of 1,4-bis(pyrrole-2-glyoxyloyl)piperazine was added portionwise to a stirred suspension of lithium aluminum hydride (8.1 g.) in tetrahydrofuran (500 ml.). The mixture was refluxed 6 hours, then left overnight at room temperature. Water (25 ml.) was added dropwise and the inorganic material was filtered off and washed well with hot tetrahydrofuran. The filtrate plus washings was evaporated and the residue was stirred with boiling ethanol and filtered off. Recrystallization from aqueous dimethyl formamide gave the product (1.0 g.) M.P. 210° (d).

*Analysis.*—Calcd. for $C_{16}H_{24}N_4O_2$: C, 63.13; H, 7.95; N, 18.41. Found: C, 63.27; H, 7.96; N, 18.54.

EXAMPLES 11 and 12

α-hydroxy-N-isopropylpyrrole-2-acetamide and 2-[2-(isopropylamino)ethyl]pyrrole 18 g. of N-isopropylpyrrole-2-glyoxylamide was added portionwise to a stirred suspension of lithium aluminum hydride (9.7 g.) in tetrahydrofuran (500 ml.). The mixture was refluxed for two hours, then left overnight at room temperature. Water (30 ml.) was added dropwise and the precipitate was filtered off. Evaporation of the filtrate gave a light-sensitive brown oil. Heating this with n-hexane gave an insoluble fraction which was twice recrystallized from ethyl acetate to provide α-hydroxy-N-ispropylpyrrole-2-acetamide as colorless prisms, M.P. 109–111°.

*Analysis.*—Calcd. for $C_9H_{14}N_2O_2$: C, 59.32; H, 7.74; N, 15.37. Found: C, 59.38; H, 7.75; N, 15.27.

The n-hexane filtrate was evaporated and the residual black oil was distilled. The colorless, light-sensitive distillate, B.P. 60–120°/0.2 mm., (7.0 g.) crystallized on standing. Two crystallizations from petroleum ether gave 2-[2-(ispropylamino)ethyl]pyrrole.

*Analysis.*—Calcd. for $C_9H_{16}N_2$: C, 71.00; H, 10.59; N, 18.40. Found: C, 71.18; H, 10.67; N, 18.12.

EXAMPLE 13

1-phenyl-4-(pyrrol-2-ylglyoxyloyl)piperazine

Pyrrole (13.4 g.) in ether (50 ml.) was added dropwise with stirring to oxalyl chloride (20 ml.) in ether (250 ml.) at −50°. After 1 hour, the solution was added with stirring and cooling to N-phenylpiperazine (50 g.) in ether (500 ml.). The resulting precipitate was collected and washed well with water to give a gummy solid which was recrystallized from benzene-hexane to provide the produce, M.P. 141–5°.

*Analysis.*—Calcd. for $C_{16}H_{17}N_3O_2$: C, 67.82; H, 6.05; N, 14.83. Found: C, 68.08; H. 5.92; N, 14.83.

If one replaces the pyrrole with 2-phenylpyrrole and the N-phenylpiperazine with 1-benzylpiperazine, following this example, the product obtained would be 1-(2-phenylpyrrole-5-glyoxyloyl)-4-benzylpiperidine.

EXAMPLE 14

2-(piperidineoglyoxyloyl)pyrrole-2-propionitrile

Oxalyl chloride (20 ml.) was added dropwise to a stirred solution of N-cyanoethylpyrrole (24 g.) in ether (250 ml.). One hour later the resultant light yellow crystals were collected giving 35.2 g. of N-cyanoethylpyrrole-2-glyoxyloyl chloride M.P. 101–2°.

The acid chloride was dissolved in methylene chloride and basified with piperidine. The solution was washed with 2 N HCl and water, dried over $MgSO_4$ and evaporated. Crystallization of the residual oil from ether provided the product as colorless needles M.P. 70–71°.

*Analysis.*—Calcd. for $C_{14}H_{17}N_3O_2$: C, 64.84; H, 6.61; N, 16.21. Found: C, 65.02; H, 6.43; N, 16.00.

Reacting oxalyl chloride with 1,3,5-trimethylpyrrole followed by reaction with morpholine as taught by Example 14 results in 1,3,5-trimethyl-2-(morpholinoglyoxyloyl)-pyrrole.

The invention being claimed is:

1. A compound selected from the group consisting of a pyrrole having the formula:

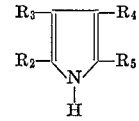

and the pharmaceutically acceptable acid-addition salts thereof, wherein $R_2$ represents a member of the group consisting of ethoxycarbonyl, 4-methyl-1-piperazinylglyoxyloyl, 4-phenyl-1-piperazinylglyoxyloyl and 2-[4-(2-hydroxy - 2 - [2 - pyrrolyl]ethyl - 1 - piperazinyl] - 1 - hydroxyethyl; $R_3$ and $R_5$ are each selected from the group consisting of hydrogen and methyl; while $R_4$ is selected from the group consisting of hydrogen, acetyl, 4-methyl-1-piperazinylglyoxyloyl and 4-phenyl-1-piperazinylglyoxyloyl.

2. A compound of claim 1; 1-phenyl-4-(pyrrol-2-ylglyoxyloyl)piperazine.

3. A compound of claim 1; 1-(4-acetyl-3,5-dimethylpyrrole-2-glyoxyloyl)-4-phenylpiperazine.

4. A compound of claim 1; 3,5-dimethyl-4(4-methyl-1-piperazinylglyoxyloyl)-pyrrole-2-carboxylic acid, ethyl ester.

5. A compound of claim 1; 1,4-bis[2-hydroxy-2-(2-pyrrolyl)ethyl]piperazine.

References Cited

UNITED STATES PATENTS

| | | | |
|---|---|---|---|
| 3,015,657 | 2/1962 | Geschickten et al. | 260—268 X |
| 3,051,710 | 8/1962 | Biel | 260—268 |
| 3,188,313 | 6/1965 | Archer | 260—268 |
| 3,274,054 | 9/1966 | Tomcufak | 260—268 X |
| 3,328,406 | 6/1967 | Wolf | 260—268 |

ALEX MAZEL, Primary Examiner

D. G. DAUS, Assistant Examiner

U.S. Cl. X.R.

260—247.5, 294, 313.1, 326.3, 326.62, 326.85, 544; 424—250